United States Patent [19]
Philipps et al.

[11] Patent Number: 5,866,253
[45] Date of Patent: Feb. 2, 1999

[54] SYNTHETIC REINFORCING STRANDS WITH SPACED FILAMENTS

[75] Inventors: Thomas E. Philipps; Darryl A. Payne; Andrew L. Bastone, all of Granville, Ohio

[73] Assignee: Isorca, Inc., Granville, Ohio

[21] Appl. No.: 914,541

[22] Filed: Aug. 19, 1997

Related U.S. Application Data

[60] Provisional application No. 60/023,575 Aug. 19, 1996.
[51] Int. Cl.⁶ .............................. B05D 1/12; D02G 3/00; D04H 1/00
[52] U.S. Cl. ................. 428/374; 427/180; 427/389.8; 427/389.9; 427/394; 427/434.6; 427/434.7; 427/356; 428/371; 428/375; 428/378; 156/167; 156/296; 156/242; 442/180; 442/362; 442/367; 442/417
[58] Field of Search .......................... 427/180, 372.2, 427/389.8, 389.9, 394, 434.6, 356, 434.7; 428/371, 374, 375, 378; 65/430, 432, 444; 442/362, 180, 331, 367, 414, 417; 156/167, 296, 242

[56] References Cited

U.S. PATENT DOCUMENTS

| | | | |
|---|---|---|---|
| 4,172,869 | 10/1979 | Oishi et al. | 264/46.3 |
| 4,305,742 | 12/1981 | Barch et al. | 65/3.43 |
| 4,939,002 | 7/1990 | Hilakos | 427/434.4 |
| 4,975,232 | 12/1990 | Hattori et al. | 264/137 |
| 5,037,689 | 8/1991 | Boyd | 428/113 |
| 5,067,046 | 11/1991 | Elton et al. | 361/220 |
| 5,076,004 | 12/1991 | Sunaga et al. | 43/18.1 |
| 5,122,417 | 6/1992 | Murakami et al. | 428/371 |
| 5,236,743 | 8/1993 | Bates et al. | 427/398.1 |
| 5,258,089 | 11/1993 | Tanaka et al. | 156/324.4 |
| 5,294,461 | 3/1994 | Ishida | 427/293 |
| 5,356,683 | 10/1994 | Egolf et al. | 428/60 |

*Primary Examiner*—Shrive Beck
*Assistant Examiner*—Michael Barr
*Attorney, Agent, or Firm*—Charles F. Schroeder

[57] ABSTRACT

The invention disclosed herein is a synthetic reinforcing strand of filaments in which the strand density is reduced by spacing the filaments apart along their length with heat expandable hollow particles such as plastic microspheres expanded into microballoons and the method of making such strands. Also embodied in the invention are methods utilizing such strands in processes for making composite structures.

22 Claims, 5 Drawing Sheets

SYNTHETIC REINFORCING STRANDS WITH SPACED FILAMENTS

This application claims the benefit of U.S. Provisional Application Ser. No. 60/023,575 filed Aug. 19, 1996.

BACKGROUND

The present invention is related to strands and bundles of filaments separated by resin containing heat expandable particles applied during the strand-forming operation or subsequently after the strand has been formed. Strands of manufactured filaments of reinforcing materials are usually made of monofilaments drawn from a feeder and gathered into an untwisted bundle which later can be used for reinforcement of composite structures such as glass fiber/resin laminates, pultruded, filament wound, compression molded, or other composite structures. Such strands and bundles can also be twisted into yarns adaptable to being woven into textile fabrics. The invention has application to use in textile fiber structures of a wide spectrum of materials including glass, carbon, polyethyene, nylon, aramid as well as metallic filaments such as of aluminum and steel.

Strands of such monofilaments during formation are usually gathered together over a gathering device in which the filaments are compacted, densifying the strands much more so than is experienced with natural fiber textile strands. In being compacted, the density of the strand approaches the density of the base material of which the filaments are made. The advantage of such strand product as a reinforcing structure is usually the high tensile strength of the monofilaments. A disadvantage of the concentration of filaments is the reduced capability of the strand or bundle to distribute the strength of the filaments in the product in which it is incorporated as a reinforcement. In order to distribute the strength, more strands are often used than are needed for the design strength requirement. For example, in pultrusion, the strands are needed to fill the die and to pull a mass of matrix material through the forming die. If the monofilaments could be spread out, they would serve the latter function but fewer strands would be needed, thereby providing lower finished product density and also an economic advantage, while still providing the desired tensile strength in the product. Such techniques have been attempted in the past by way of using spun roving and by texturizing the strand or bundle to bulk the reinforcement, in addition to using mats. The present invention, however, provides considerably more spacing between filaments in such filament structures than has been possible with much of the prior art.

SUMMARY OF THE INVENTION

According to the present invention, the filaments of a strand are separated by expanded binder material, usually of resin, which is first incorporated as unexpanded expandable particles in the strand, for example as part of the sizing fluid prior to the gathering operation in forming of the filaments, or in a process of impregnating the strand with coating material after formation.

A principal feature of the present invention is that the binder particles interspersed between filaments in the strand are heat-expandable material so that upon further processing it will not only bind the filaments of the strand but also will result in spacing of the filaments so that the strand has an enlarged cross sectional dimension. Still further, the concept of the invention embodies use of expandable resin particles such as plastic unexpanded microparticles. Expancel is the trade name of one such product which is particles of unexpanded heat expandable resin available commercially from Casco Products AB of Sundsvall Sweden. The particles contain a gasifiable liquid such as isopentane or isobutane which upon heat treatment, expands into balloons between the filaments and separates the filaments one from another, while at the same time interbinding the filaments into bundles. The resin which binds the microballoons to the filaments also binds the filaments together and in the case of highly soluble resin, reduces, the presence of voids along the length of the strand. The expanded microballoona, when cooled to room temperature, retain the form of expanded balloons. If a percentage of the expandable particles are expanded to a large size to the stage of bursting, the burst balloon "shells", it has been observed, stick to the filaments, while still effecting a bonding of the filaments in their separated relationship. The same occurs with partially and fully expanded microballoons acting as a cushion and providing separation.

Strands of filaments herein exemplified by glass filaments separated by expanded microballoons between the filaments beside providing a distribution of reinforcing elements have an added advantage in that they are somewhat cushionable or compressible. Such compressible strands have advantage in some cases such as in pultrusion processes in which a resin mass is drawn by the filaments through a die to form composite shapes in which the strength-giving filaments are distributed at a lower density in the composite form rather than being concentrated in the matrix of the composite.

Filaments or strands separated by particles expanded into microballoons in pultrusion processes act to fill space in the product being produced. That is, the expanded strands or bundles of filaments are distributed throughout the cross section of the die in which the product is being formed and in this sense the group of filaments are puffed-up and have a cross sectional resiliency. In other words it is desired that the bundle of expanded strands have a resiliency or an expanding property like a spring as they pass through the die to cause conformance of the bundles of coated filaments to the intricacies of the die. That is, the resilient glass filament bundles with resilient expanding characteristics effect filling of intricate details such as small ridges in a precision designed die opening. Thus, a more precision-like final product can be made by use of the microballoon filled bundles of glass filaments which product would likely not be producible by other techniques utilizing nonexpanded or noncompressive bundles of reinforcing filaments. Furthermore in the use of conventional nonexpandable bundles of glass filaments in such processes, a greater number of filaments would be required to fill intricate or precision detailed parts of a die.

The strands of filaments separated by heat expandable particles therebetween can be chopped into short lengths and expanded by the particles by heat treatment of the short lengths into a larger cross-sectional dimension. Expanded strands can be incorporated in extruded, compression molded, filament wound, or otherwise manufactured plastic products (as long as the external pressure does not collapse the balloons) with the effect that the filaments are more widely distributed in the mass instead of the usual concentrated conventional strands of filaments. As an example, external pressures in the order of 200 psi under some conditions will be a limit, dependent upon the microballoon wall thicknesses, diameters and vapor pressures and temperatures of the internal gasses. The result is a lower volume ratio of filaments to the matrix, a lower overall product density and a lower cost.

The concept of this invention is exemplified and embodied in glass filament strands because of the economics of utilization of strands of such material, but also contemplates applicability of use with high tensile strength reinforcing filament strands of materials such as carbon or aramid or any number of other commercially available strands of reinforcing material. Typical unexpanded microballoons are hollow microspheres having a diameter on the order of 10–12 microns. They have an unexpanded heat gasifiable liquid in their centers such as isobutane. In expanded condition they acquire a diameter of 40–50 microns. By contrast the diameter of M size glass filaments is about 16 microns.

Unexpanded dried strands containing expandable particles can be incorporated in mats, either woven or nonwoven, which can subsequently be expanded by further heat treatment. It should be recognized that engineered products can be made with expandable particles or expanded particles which can be incorporated in strands originally treated with ordinary binder materials to lock the filaments together in tight bonded relationship. That is, it is desired that the binder will not dissolve such as in the usual polyester resin used as a matrix for laminates. Basically in such applications the binder material is desirably insoluble. In addition, the binder material must be chemically bonded into the matrix system. An acrylic is a candidate in this regard and is desirable because of the cleanliness in which it can be handled.

BRIEF DESCRIPTION OF THE DRAWINGS

Turning to the drawings at greater detail, FIG. 1 illustrates a strand of continuous filaments incorporating expanded particles of heat expanded material. The invention is here represented by a continuous glass strand containing continuous side-by-side filaments with particles in between the filaments expanded into microballoons by heat treatment to effect both a binding of the filaments together as well as to effect a spacing of the filaments in the regions where the particles were present. The strand 10 of FIG. 1 is illustrated in a magnified illustration in FIG. 2A in which the filaments 11 are spaced apart by expanded microballoons 12. A soluble binder material 13 substantially fills the spaces between the filaments 11 and the microballoons 12. FIG. 2B illustrates how an insoluble binder 17 in the strand functions with the microballoons in binding the filaments in spaced relation with nonwet-out voids 19 present in the strand.

In effecting the spacing of the filaments, the diameter of the strand is increased about four-fold over that in which the continuous filaments are conventionally or normally prevent without such expanded particles. A feature is thus that the strand density is considerably reduced dependent upon the volume of spacing of the filaments effected by the amount of expanded particles incorporated in the strand. Thus the disadvantage of heavy density of synthetic filaments gathered together into a concentrated or small spacing can be overcome. Any incorporation of desirably high tensile strength filaments in matrix materials can be distributed in a product in which they are incorporated as reinforcements.

Figure 1:
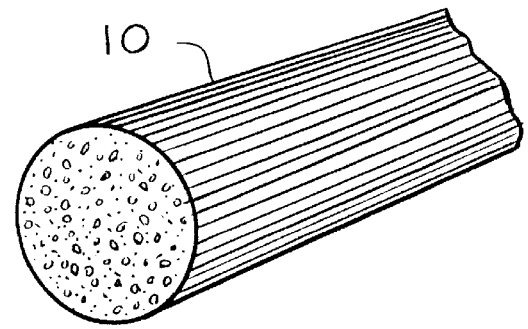
FIG. 1 illustrates a portion of a strand of reinforcing filaments such as glass filaments illustrating at a cut end the distribution of glass filaments in spaced relation in the strand.
Figure 2A:
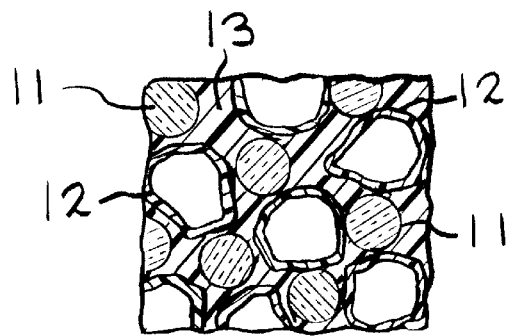
FIG. 2A is a magnified view of the strand of FIG. 1 illustrating glass filaments spaced apart by expanded microballoons therebetween with a soluble resin binder incorporated therein.
Figure 2B:
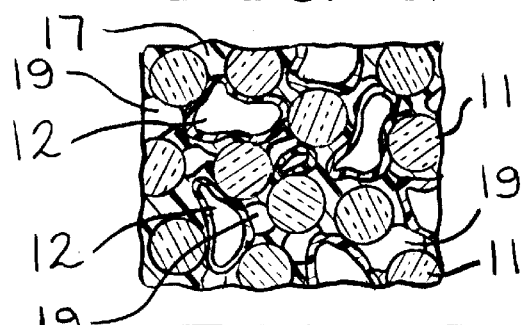
FIG. 2B is a magnified view of the strand of FIG. 1 illustrating glass filaments spaced apart by expanded microballoons therebetween with an insoluble resin binder incorporated therein.
Figure 3:
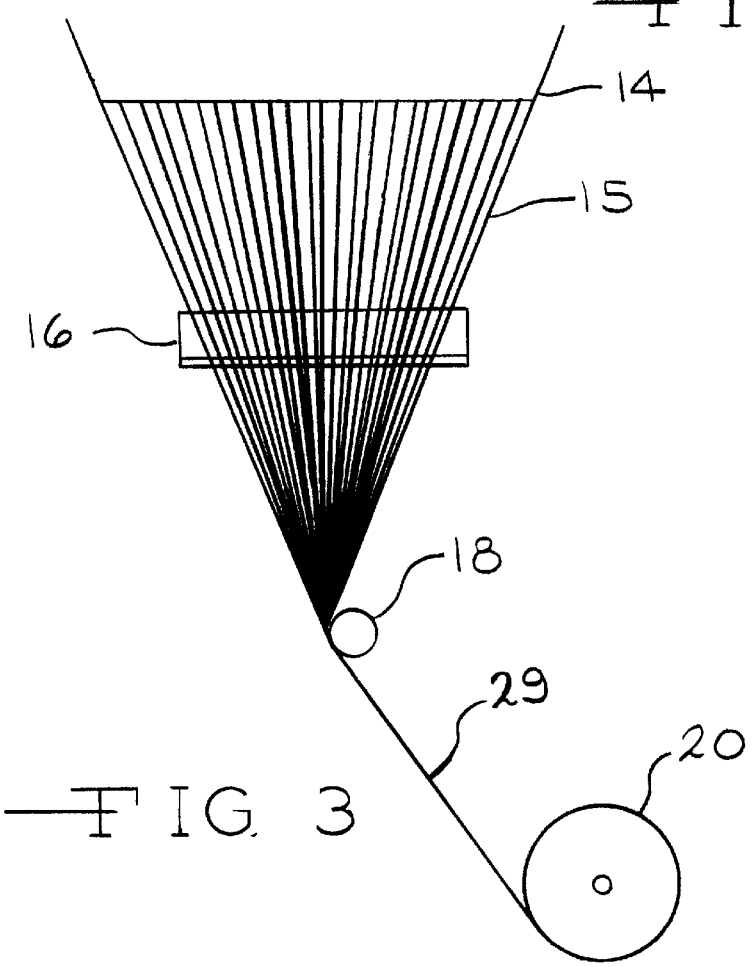
FIG. 3 is an illustration of a glass fiber-forming operation in which the expandable particles are introduced in sizing fluid applied to the filaments of a strand prior to gathering and collection into a package.

FIG. 3 illustrates how glass filaments can be supplied with a sizing or binder solution containing unexpanded particles of heat expandable material in a filament forming operation. A glass filament forming feeder 14 supplies filaments 15 which are gathered into a strand 29 by passage over a gathering member 18. In advance of the gathering step at the gathering member 18, the filaments are passed over a sizing applicator 16 in which unexpanded particles can be supplied to the filaments in a sizing or binder for the strand 29 prior to its being wound into a strand package 20 at a winder.

Thus a strand package is formed in a filament forming operation in which unexpanded particles are supplied to the individual filaments of the strand for subsequent heat treatment and expansion of the strand in which the filaments become spaced from each other and thereby increase the diameter of the strand with a consequent reduction in the density of the strand. An example of a polyester based sizing solution formulation is as follows:

| Wt. % Range | Ingredient |
| --- | --- |
| 2–4% | Emulsifiable polyester resin |
| 0.05–0.30 | Lubricant |
| .25–.50 | Silane coupling agent |
| 0.1–0.5 | pH adjustment |
| 0.3–1.0 | Expancel heat expandable particles |
| Remainder | Water |

The coating on the filaments, amounting to about 0.03 grams/meter, beside acting as a sizing will cause the strand to expand upon supply of heat thereto. Upon being heated to a temperature of 240°–280° F., most of the styrene is driven off and the particles expandable into microballoons will increase in size from a selected range for example of 6–9 microns (classified as small) or 18–24 microns (classified as large) to diameters 40–70 times larger. Subsequent processing in which the strand is expanded by heat, such as by incorporation in the matrix of products in which the filaments act as reinforcing elements, provide products which have the advantage of the reinforcing filaments being more widely distributed in the matrix, and correspondingly the strength-giving properties of the filaments are also distributed more widely in the product.

Figure 4:
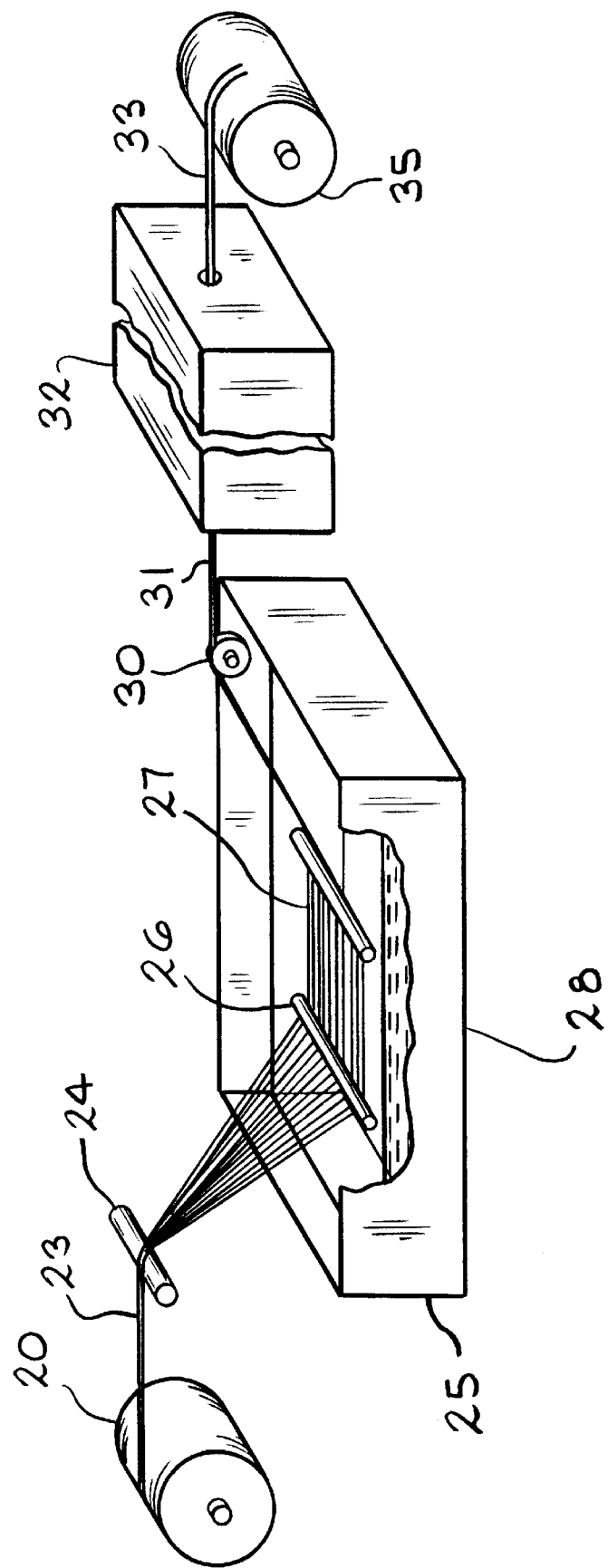
FIG. 4 is a schematic illustration of another process by which a conventional reinforcing strand is drawn from a package then separated and passed through a dip slurry of binder material containing heat-expandable particles.

FIG. 4 is an illustration or a process in which ordinary previously formed strands or rovings can be processed to receive particles of unexpanded heat expandable particles. A strand 23 is drawn from a package 20 passed over a guide member 24 through a slurry 28 in a dip tank 25 where the filaments of the strand are spread and held apart by spreaders 26 and 27 respectively to wet out the filaments. The filaments are thus passed through the slurry 28 for receipt of a coating containing the unexpanded heat expandable particles prior to being gathered into a coated strand 31 upon passage over a gathering member 30.

(1) An insoluble type binder, a water based emulsion including:
  15% (solids basis) Flexbond 845
  A vinylacrylic copolymer commercially available from Air Products & Chemical Corp.
  5% (Solids basin) unexpanded particles expandable into microballoons. Expancel 091 DU or 091 WU available commercially from Casco Products AB of Sundsvall Sweden
  80% water (2) A soluble type binder (preferably of low viscosity
  95% E701, an isophthalic polyester commercially available from Alpha Owens Corning Corp.
  50% unexpanded particles expandable into microballoons. Expancel 091 DU available commercially from Casco Products AB of Sundsvall Sweden The strand of coated filaments can be passed through a drying oven 32 which is heated to a temperature just adequate to dry the strand 33 as it is wound into a package 35. As an alternative if desired the strand 31 can be heated in the oven 32 at a high enough temperature to effect a drying as well as expansion of the particles for spacing of the filaments in the strand 33 being wound into the package 35. In other words the strand is produced with a dry unexpanded form of the expandable particles for subsequent heat treatment of the strand 33 to effect its expansion, or the strand can be heat treated in the oven 32 to effect its expansion into an enlarged strand of spaced filaments. The expanded strand is wound into the package 35 for subsequent utilization in product forming processes in which the filaments are to be utilized in their distributed relation for reinforcement of the product. In this regard the expanded strands can be used directly in pultrusion processes, filament winding, or other such processes or can be chopped into short lengths for use as reinforcements in matrix material molded into products.

Figure 5:
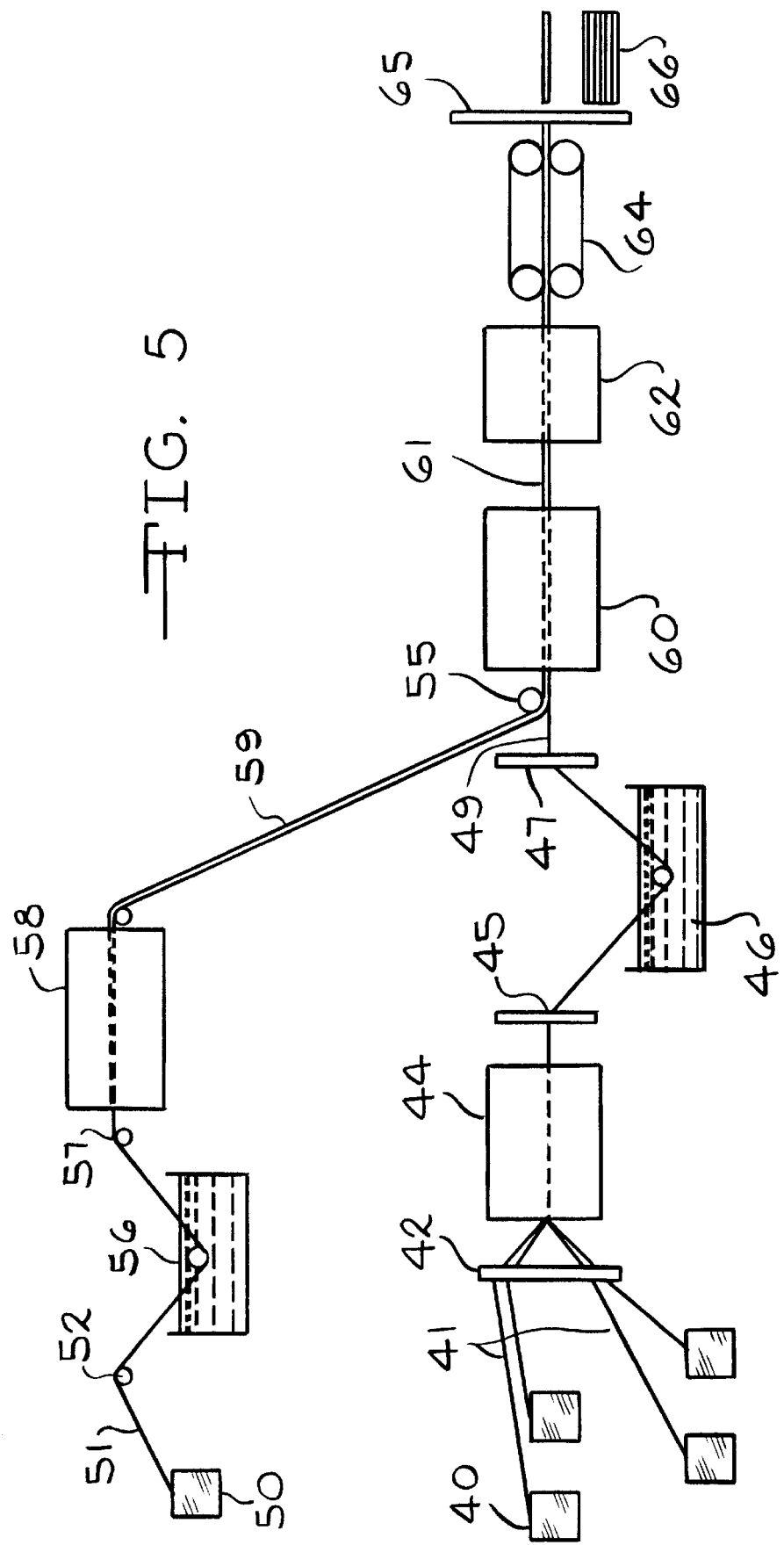
FIG. 5 is a schematic illustration of a pultrusion process in which rovings or strands in which filaments are at least partially spaced apart by resin microballoons are pulled through a heated die to form a product such as a structural member which may be either solid or hollow.

FIG. 5 illustrates a pultrusion process in which ordinary strands or rovings 41 of continuous filaments drawn from packages 40 can be supplied with resin and act as a carrier for the resin used in the pultrusion process while another group of filaments 51 combined therewith can be supplied with unexpanded microballoon particles or other heat expandable particles in a slurry 56, then expanded in an oven 58 and passed through a heated die 60 along with the resin conveying strands to form a pultruded product such as a structural member which can be either solid or hollow, dependent upon the die design. In the illustrated process, roving packages 40 supply strands or rovings 41 which are passed through a guide 42 then through a guide 45 for passage through a resin bath 46. The resin of the product to be formed in the die is thus provided in this bath whereupon it is carried through guide 47 which guides the passage of the resin coated bundles of filaments through a heated die 60.

Along with the bundles of resin coated filaments, strands of filaments incorporating heat expanded particles are also supplied. The strands 59 containing the heat expanded particles are formed by being drawn from a roving package 50 in the form of strands 51 which are passed over a guide 52 and then dipped into a slurry containing heat expandable particles 56. The strands coated with the heat expandable particles are passed over a guide 57 through a drying and heating chamber 58 in which the particles carried by the strands passing through the chamber 58 are heated to a temperature to expand the particles. In most cases the particles are heated to expand them into microballoons. They are heated to a stage where the microballoons effect a separation of the filaments without bursting. If desired, however, they can be heated so that at least some of the particles are expanded to microballoons and others are caused to burst and act principally as binding material for the spaced filaments. In such instances a major portion of the filaments can be retained in spaced relation by the microballoons formed in the strand.

The heat expanded strands 59 are pulled over or through guides 53 and drawn together with the resin coated strands 49 as a combined mass which is drawn through the heated die 60 by a pulling means such as a puller 64 which feeds the pultruded product to a cutter 65 to cut the continuously formed product into desired lengths as finished products 66. A structural member 61 which, as pointed out, can be either solid or hollow, can be pulled through a post cure oven 62 which is optional, dependent upon the design of the product produced.

In pultrusion processes microballoons containing bundles of glass filaments with particles in an expanded condition can be introduced into the center of a surrounding plurality of ordinary resin coated strands passing through a die. The expanded bundles in passing through the die, in being cushionable, push outwardly against the outer coated strands as they pass through the die. The intricacies of the die thus can be fully matched by the compressive forces exerted by the inner core to the outer bundles to push them into corners or intricate shapes such as might include ridges in the die. A lighter weight product can thus best be made with fewer glass filaments in the bundles than would otherwise be required to assure a full compliance or conformity to the intricacies of the die. By way of example, in actual pultrusion tests, two bundles containing Expancel particles in the inner core replaced four bundles of resin coated glass filaments. Such replacement is dependent upon die shape, part shape and related factors.

Figure 6:
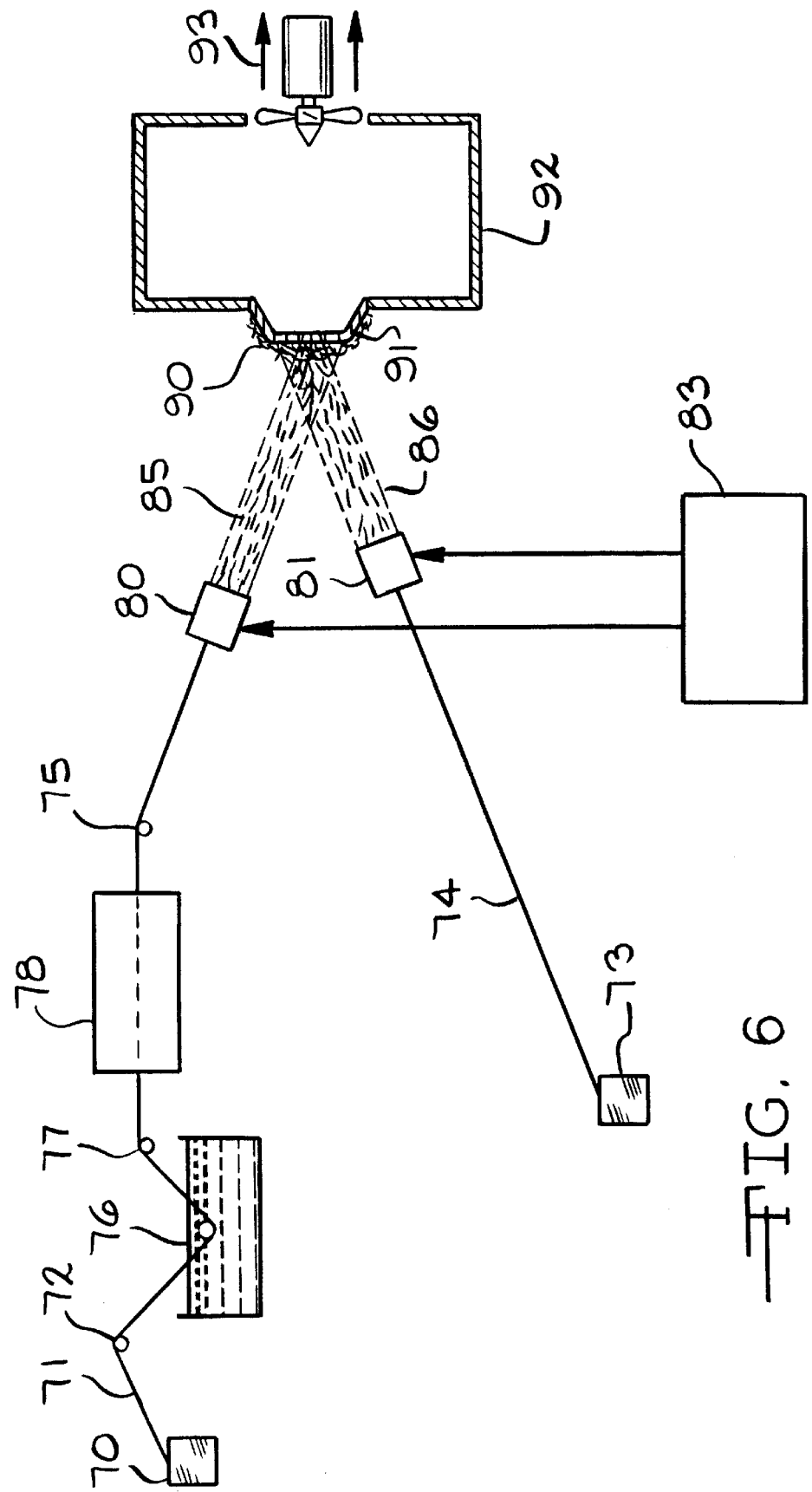
FIG. 6 is an illustration of a fiber preform process in which filaments supplied with expandable particles are chopped and supplied or fed to a preform unit to produce a preform of fibers including unexpanded or expanded microballoon particles as desired.

FIG. 6 illustrates a fiber preform process in which a 3-dimensional preform of chopped fibers can optionally contain up to 100% fibrous masses incorporating expanded microballoons or can incorporate fibers with unexpanded particles for subsequent heat treatment in the formation of finished products. In the process as illustrated, however, such fibers are combined with optionally included chopped fibers coated with a binder. In this regard roving is supplied in the form of a bundle of strands 71 drawn from a package 70 and passed over a guide 72 from which it is dipped into a binder bath containing unexpanded particles which will expand into microballoons. The coated strands leaving the bath 76 are passed over a guide 77 and passed through a drying chamber 78 and then over a guide 75 to a chopper 80 which chops the roving bundles into discontinuous chopped lengths of fibers 85. The bundles of strand passed through the drying chamber 78 can be optionally heated to a stage such that the particles are merely dried and not expanded for incorporation of the chopped fibers with unexpanded heat expandable particles in the preform. Alternately the chopped fibers can be heated to a stage where the particles are expanded to their full extent causing the chopped fibers to be spaced in the chopped bundles as they are deposited in the preform.

In addition, a roving bundle of strand 74 can be drawn from a roving package 73 for passage through a chopper 81 which can be combined with the chopped bundles containing the expandable or expanded chopped bundles at a preform 90. Binder can be supplied to the choppers 80 and 81 from a binder supply 83 to supply an adequate amount of wet binding material to the bundles of fibers to provide the desired integrity in the preform 90.

To produce such products, a preform forming unit 92 has a preformed screen 91 positioned for passage of air therethrough drawn by a fan 93. Thus a preform can be made with chopped fibers, all of which are supplied with unexpanded heat expandable particles or with chopped fibers which have particles which have been expanded to space filaments from each other and optionally, in addition, chopped fibers can be supplied with ordinary unexpandable binder. The fiber preform with such chopped bundles of fibers can be subsequently processed as desired by the addition of resin in a press or combination with other preforms to provide desired laminate products of preselected design.

Expansion of particles can occur in a strand either in a preform or in a sheet of filaments, Expansion can also occur in forming a plastic composite in which case expansion of particles in the product can be accomplished during the molding process. In other words the unexpanded particles can be expanded in a molding process regardless of the form in which the glass filaments or chopped fibers are presented.

Summarily, it should be recognized that resin particles when expanded into microballons are extremely low in density as a mass and when included on almost any synthetic filament in a bundle, they have the effect of reducing the density of the overall bundle and make the strand or roving bundle of fibers much more useful for purposes other than is possible with conventional groupings of synthetic filaments.

Microballoons can be used to separate filaments in a wide range of textile structures, principally strands, rovings and yarns of such filaments. The fibers can be continuous or discontinuous synthetic fibers or natural fibers in a textile structure. A "textile structure," as referred to herein can be continuous filaments in side-by-side relation or discontinuous fibers in a bundle form.

As pointed out, when filaments of glass are passed through a bath of unexpanded bubble or microballoon particles, the carrier resin in the bath need only be a minimum coating adequate to maintain the unexpanded bubble particles in place for subsequent use of the strand formed by gathering the filaments after passage through the bath. It is preferred that the coating material on the filaments be compatible with the matrix material into which it finally is included. For example, if a polyester resin is to be the base or matrix material in the final product, the coating on the filaments would preferably be polyester resin as well. Again, as pointed out, the amount of polyester resin coated in the bath is desirably only that necessary to hold the unexpanded bubble material in place in a strand. The viscosity of the bath then becomes a variable to consider. In this respect, the viscosity in most instances is preferred to be a low viscosity such that a minimum coating is supplied on the filaments, as well as for ease of penetration into the strand. This concept also adds to lowering the density of the final product in that the bubbles are allowed to expand with a minimum obstruction from the coating material and will have the result of lowering density to a greater degree because the coating on the filaments is not an element which adds significantly to the density of the matrix.

In forming a strand such as in a forming room, it is desirable to use a water based polyester emulsion as a carrier for the microballoons. Such a water based polyester carrier is compatible with a final matrix of polyester but in addition reduces the volatile materials in the forming room, which correspondingly makes it more acceptable from an environmental standpoint.

The invention extends further to providing a sizing of resin material on glass filaments in their forming operation in which the resin sizing material contains the unexpanded microballoon particles. Examples of such sizing material, in addition to polyester resin with unexpanded microballoons, are polyvinyl acetate, epoxies, and vinyl esters as well as any number of other heat softenable sizing materials presently used in glass fiber forming operations.

It is contemplated that for most present sizes the unexpanded microballoon particles can be added in the bath of the sizing applicator and provide the results desired. Almost any existing binder or sizing material can be utilized and converted to expandable material by incorporation of the unexpanded microballoon particles therein.

The resin on the filament strands can be either soluble or insoluble in relation to the resin matrix of the laminate in which they are incorporated. When a soluble resin is used, it reduces the tendency toward or eliminates moisture absorption in the final product. Water based non-catalyzed resin which presents little or no toxic emissions functions well for such results. Such soluble resins also function well as a carrier for unexpanded heat expandable particles as well as already expanded microballoons or microbubbles.

When it is desired that the filament bundles containing the microballoons or filament spacers be resin-starved to produce a lighter weight product, an insoluble resin has been found to be effective. When an insoluble resin such as a cross linked polyester is used, the wet out and depth of penetration into a filament bundle is minimized causing the resin in effect to provide an outer shell for the bundle and an interior which has resin voids. Thus such bundles of filaments in a product have a relative resin-void interior which is porous and consequently has a lighter weight than if filled with resin. That is, where insoluble resin is applied to the strands, the resin does not fully penetrate a bundle and tends to ride on the surface and in a sense forms a resin outer shell. Upon later incorporation in the matrix, the shell becomes a part of the matrix and the unexpanded resin particles expand and cause the filaments being separated from each other prior to passage through a die or incorporation in a laminate.

The insoluble coating on the strand forming the shell for the contained filaments and microballoons within is thus helpful in providing a low volume product for shipment or Storage and for later use in product processing to provide the final product in which the strands are incorporated in expanded condition. In other words, the unexpanded form of the strand provides a convenience for handling and shipment and storage prior to processing for incorporation into a final product.

As pointed out when a bundle of strands of glass fibers contains interspersed unexpanded resin particles, the soluble resin will act to fully penetrate the entire mass and form a solid relatively non-porous combination. When the coating material is insoluble resin, it is found that penetration is limited and that the final coated bundle is porous and will absorb or pass dye materials throughout the length of the mass or in other words, a dye can be wicked through the length of the mass of coated fibers.

Utilization of insoluble coating material translates into formation of porous regions along the length of the strand incorporated in products such as products formed by pultrusion techniques. Further in this regard, the relative hollow space in a matrix formed in pultrusion can be utilized in the formation of structural members such as I-beams in which the hollow space can be located in lesser-stressed regions of such structures, such as in the web portion of the I-beam.

Figure 7:
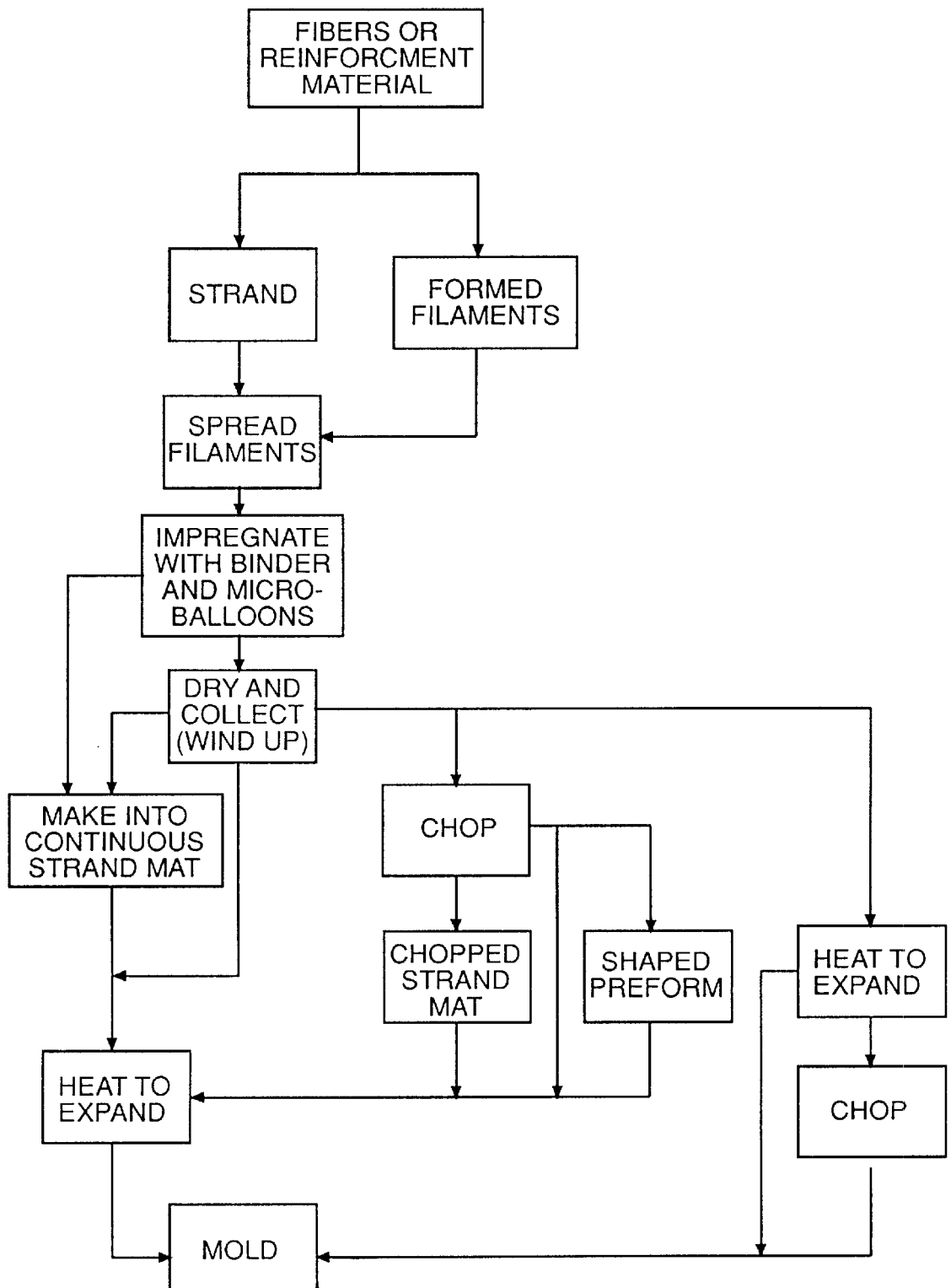
FIG. 7 is a flow chart of some of the more common ways in which the product of the invention can be formed and utilized.

FIG. 7 is a flow chart showing how a strand is processed in the systems illustrated in the previous figures. The strand or rovings of reinforcing material are passed through slurries or binders with heat expandable material, preferably the heat expandable particles which will expand into microballoons upon heating. Continuous strand mats can be produced for subsequent molding or the filaments can be wound for subsequent heat expansion supply to a process. The strands incorporating the heat expandable particles can be chopped and incorporated in a chopped strand mat or chopped and incorporated in a preform. In still another arrangement, the strands containing the heat expandable particles can be heated to effect a separation of the filaments and then chopped and batched for later incorporation in a molding process.

Strands impregnated with heat expandable binder particles can be incorporated in a filament winding process, a pultrusion process, in compression molding, resin transfer molding, structural reaction injection molding, or in injection molding. As illustrated, continuous strand mats and wound packages of the roving incorporating the heat expandable particles and chopped strand in chopped strand mats and shaped preforms can all be stored with the particles in unexpanded condition for later heat expansion in the desired process.

In view of the foregoing, it will be understood that many variations of the arrangements of the invention can be provided within the broad scope of principles embodied therein. Thus while particular preferred embodiments of the invention have been shown and described, it is intended by the appended claims to cover such modifications which fall within the true spirit and scope of the invention.

We claim:

1. A strand of continuous reinforcing filaments comprising a plurality of monofilaments in side-by-side relationship,
    particles of heat-expandable material, expandable into microballoons, dispersed between said filaments along the length of said strand,
    said particles of heat-expandable material being present in and along the length of said strand in an amount such that said filaments upon heating and expansion of said particles are spaced from each other by the expanded particles.

2. A strand of reinforcing filaments as set forth in claim 1 in which said particles of heat-expandable material are hollow resin particles having an unexpanded gasifiable liquid in their centers which upon supply of heat thereto expand into hollow microballoons in said strand to space said filaments from each other.

3. A strand of continuous reinforcing filaments as set forth in claim 2 in which said filaments are glass filaments.

4. A strand of continuous reinforcing filaments as set forth in claim 2 in which said filaments are made of glass,
    said glass filaments having been supplied directly from a glass filament forming operation,
    said filaments having been coated in said operation with sizing material containing unexpanded particles of said heat expandable material in the formation of said strand.

5. A strand of continuous reinforcing filaments as set forth in claim 3 in which said filaments are coated with a binder containing particles of said heat expandable material.

6. A strand of continuous reinforcing filaments as set forth in claim 1 wherein said reinforcing filaments are made of materials selected from the group consisting of glass, carbon, polyethylene, nylon and aramid.

7. A method of forming a strand of continuous filaments adaptable to being lightened in density by providing spacings between filaments along their length comprising
    drawing a strand of side-by-side continuous filaments through a bath of coating material containing resin particles heat-expandable into microballoons,
    separating the filaments of said strand in spread relation as said strand In drawn through said bath for receipt of a coating of said bath material on said filaments,
    regathering the coated filaments into said strand with said heat-expandable material distributed there-through,
    supplying heat to said strand of coated filaments to effectively dry said strand without expanding said heat expandable particles.

8. The method of decreasing the density of a strand formed according to the method set forth in claim 7 comprising supplying heat to said dried strand to expand said particles into microballoons and thereby space filaments from each other and imparting a resilient compressibility along the length of said strand.

9. The method of making a mat of heat expandable strands formed as set forth in claim 7 comprising collecting a plurality of such strands in a layer,
    supplying an uncured binder material in distributed relation in said layer of strands,
    curing said binder material to interbond said strands in integrated relation as a mat.

10. The method of increasing the compressibility of the mat made according to the method set forth in claim 9 comprising
    supplying heat to said mat to expand said particles into microballoons and thereby space filaments of said strands from each other along their length.

11. The method of making a pultruded resin product including an expanded compressible strand formed according to the method of claim 8, comprising drawing such a strand containing expanded microballoons through a pultrusion die, coating another strand of continuous filaments with resin for forming a matrix for the desired product, drawing said other coated strand and matrix resin thereon along with the said expanded strand through said pultrusion die, the dimensions of said expanded strand and said other coated strand being such as to cause said expanded resiliently compressible strand to exert expansion forces to assist filling the die detail for forming the desired product.

12. A method of forming a shaped preform for reinforcement of a composite product incorporating a heat expandable strand made according to the material set forth in claim 7, comprising chopping said strand into discontinuous lengths, supplying a wet binder to said chopped lengths of strand, distributing said discontinuous lengths of strand and binder on a base of desired shape to form a preform conforming to said shape, drying the wet binder of said preform to impart an integrity thereto for further processing into a desired product.

13. A method of forming a reinforced composite product incorporating a preform made according to the method of claim 12,
    comprising heating said preform to expand said expandable particles into microballoons to provide a spacing between filament portions in said discontinuous lengths of strand,
    combining a heated resin matrix material with said preform in producing a product incorporating said preform as a reinforcement.

14. A method of forming a reinforced composite product as set forth in claim 13 in which said preform is heated by said heated resin matrix material in the step of combining said matrix material with said preform.

15. A method of producing an expandable strand of continuous glass filaments comprising drawing glass filaments from a glass filament forming feeder, applying to said filaments a coating of sizing fluid containing heat expandable particles expandable into microballoons gathering said size coated filaments including said heat expandable particles into a strand and drying said strand without expanding said particles.

16. A method of producing an expandable strand of glass filaments as set forth in claim 15 including collecting said expandable strand into a package for subsequent processing into a product.

17. A method of producing an expandable mat including a strand of glass filaments packaged as set forth in claim 16 comprising drawing said strand from said package and assembling with other glass filament strands an unwoven expandable reinforcing mat expandable in thickness upon supply of heat thereto.

18. A method of producing an expandable mat including a strand of glass filaments packaged as set forth in claim 16 comprising drawing said strand from said package, and assembling with other similar glass filament strands a woven expandable reinforcing mat expandable in thickness upon supply of heat thereto.

19. A strand of continuous glass monofilaments in side-by-side relationship including expandable hollow particles dispersed between said filaments along the length of said strand, said particles being expandable into microballoons by application of heat thereto, said particles being present in an amount such that said filaments upon heating and expansion of said particles into microballoons are spaced from each other by said microballoons.

20. A strand of continuous glass filaments as set forth in claim 19 in which said heat expandable particles have been heat expanded into microballoons to expand said strand by spacing said filaments from each other.

21. A strand of continuous glass filaments as set forth in claim 20 in which said strand of filaments is coated with a binder which fully impregnates said strand.

22. A strand of continuous glass filaments as set forth in claim 20 in which said strand of filaments is coated with a binder which does not fully impregnate said strand and forms resin-starved voids on the interior of said strand.

* * * * *